United States Patent [19]

Goguelin

[11] Patent Number: 4,913,774

[45] Date of Patent: Apr. 3, 1990

[54] REINFORCED THERMOPLASTIC MATERIAL AND PROCESS OF PREPARATION

[75] Inventor: Michel Goguelin, Charavines, France

[73] Assignee: Arjomari-Prioux S.A., Paris, France

[21] Appl. No.: 296,879

[22] Filed: Jan. 12, 1989

Related U.S. Application Data

[63] Continuation of Ser. No. 161,975, Feb. 29, 1988, abandoned.

[30] Foreign Application Priority Data

Mar. 5, 1987 [FR] France ................................ 87 02987

[51] Int. Cl.$^4$ ............................................. D21H 3/00
[52] U.S. Cl. ................................. 162/158; 162/168.1; 162/169; 162/183
[58] Field of Search .................... 162/168.1, 169, 158, 162/183

[56] References Cited

U.S. PATENT DOCUMENTS

| | | | |
|---|---|---|---|
| 3,102,837 | 9/1963 | Griswold | 162/169 |
| 3,912,581 | 10/1975 | Fink et al. | 162/169 |
| 3,933,579 | 1/1976 | Kershaw et al. | 162/169 |
| 4,481,075 | 11/1984 | Dailly et al. | 162/183 |
| 4,734,321 | 3/1988 | Radvan et al. | 162/169 |

*Primary Examiner*—Peter Chin
*Attorney, Agent, or Firm*—Bacon & Thomas

[57] ABSTRACT

A reinforced thermoplastic material is made according to a wet process starting with an aqueous suspension of reinforcing fibers and of a powder obtained by grinding of granules composed of at least one thermoplastic resin and at least one adjuvant. The material is intended to be transformed by molding, molding-stamping or thermomolding into the final product.

8 Claims, No Drawings

REINFORCED THERMOPLASTIC MATERIAL AND PROCESS OF PREPARATION

This application is a continuation of application Ser. No. 161,975, filed Feb. 29, 1988, abandoned.

The present invention oncerns a reinforced thermoplastic material, made from an aqueous suspension of reinforcing fibers and intended to be transformed by molding, molding-stamping or thermomolding.

Sheet materials are already known which are made of reinforcing fibers and a powdered thermoplastic resin, these materials being especially transformable by molding-stamping or thermomolding into the final product.

Document numbers EPA39292 (Arjomari) and EPA71219 (Dow) describe a process for preparing such materials by the papermaking technique. According to this procedure, a suspension of the reinforcing fibers, the thermoplastic resin and certain adjuvants is formed in water, the suspension is deposited on a cloth screen or web, the suspension is dewatered to obtain a wet sheet, which is then dried to obtain the sheet material. According to this procedure, a binding agent and a flocculant should be added to the aqueous suspension to ensure the cohension of the sheet; that is, the joining of the fibers and the resin, and to obtain good retention of the adjuvants in particular. These adjuvants, such as pigments and stabilizing agents, are necessary to confer certain physical characteristics to the final product, to ensure its longevity, or to faciliate its fabrication.

These additives, which are well known to one of ordinary skill in the art, are very often solids at ambient temperature. It is necessary to introduce them in very small doses to the aqueous suspension, and because of this, they are mixed in the form of very fine particles with the virgin thermoplastic resin before formation of the sheet in order to obtain an intimate and homogenous combination with the resin in the final product.

Due to the fact that tese adjuvants have a particularly small size, smaller than the size of the mesh of the cloth screen on which the suspension is deposited, they have a tendancy to pass through the mesh during dewatering, either by gravitation or by aspiration, and particularly if the suspension does not contain either a binding agent or a flocculant. The water which is removed thus contains significant quantities of these adjuvants which are lost. They are not returned to the dewatered sheet. The retention of adjuvants, particularly of small diameter, is therefore poor.

On the other hand, some of the additives are organic liquids which are not miscible in water. It is very difficult, if not impossible, to retaint hese additives in the wet sheet without the aid of expensive artificial materials. For economical reasons, research is constantly being conducted to lower the cost of production for products of equal quality.

An object of the invention is thus to obtain, by wet means, i.e., by means of an aqueous suspension, a reinforced thermoplastic material, which when transformed gives a product exhibiting properties of adjuvants which are non-miscible in water.

An object of the invention is to resolve the problem of retention of the particular adjuvants contained in the aqueous suspension deposited on the cloth screen at the time of dewatering of the suspension.

Another object of the invention is to avoid the use of the binding agent and the flocculant.

Processes are known for mixing thermoplastic materials with solid loads. These processes are described in U.S. Patent 3,997,494 and U.S. Patent 4,045,403. They consist of progressively heating the particles of thermoplastic material with the load as the mixture is stirred.

The present invention provides a process of production and a composition which particularly resolves the problems of retention previously discussed without necessitating additional binding agent or Flocculant. By "flocculant" it is intended to include any ionic agent or system, modifying in the aqueous mixture the surface charge of at least one of the constituents, by inversion or by neutralization, in a manner which permits its retentions by flocculation or association with one or more other constituents of the material.

The process of the invention is a wet process, comprising the steps of forming an aqueous suspension containing the reinforcing fibers, at least one thermoplastic resin and at least one adjuvant, followed by dewatering of the suspension on the cloth screen of a form. The wet process may be of the papermaking type.

According to the invention, the thermoplastic resin and the adjuvant are intimately mixed in each grain of a thermoplastic powder having a granulometry which is larger than the voids in the mesh of the screen on which the aqueous suspension is dewatered. The thermoplastic powder is introduced into the aqueous suspension prior to dewatering. The form which is used for dewatering is preferably a Fourdrinier type flat table section used in papermaking processes.

The expression "intimately mixed" means that the grains of powder comprise a homogenous mixture of the thermoplastic resin and adjuvant. The adjuvant being emprisoned or entrapped in the grains of thermoplastic is completely retained therein. Therefore, there is no need for the addition of a binder or flocculant during the preparation of the material as required by the prior art. The composition of the present invention thus differs from those in which the retained adjuvant surrounds the grains of thermoplastic resin.

The powder of the present invention may be formed by grinding granules of the thermoplastic resin and adjuvant. Conventional extrusion techniques are used to form the granules of resin and adjuvant, which after cooling or other conditions used to form granules, may be ground into the powder used in the present invention.

The invention also concerns the material made by taking an aqueous suspension comprising, in addition to the reinforcing fibers, a powder obtained by grinding the granules of each of at least one thermoplastic resin and at least one adjuvant.

The reinforcing fibers used in the composition of the invention have their physical structures unchanged after transformation of the material at high temperature and are selected from the following group: glass fibers, carbon fibers, ceramic fibers, boron fibers, glass wool, rock wool, metallic fibers, synthetic organic fibers of high melting point (aromatic polyamides, polyesters and others). Several types of fibers can be used in the same material.

Preferably, the material is a sheet made by starting with glass fibers.

·The theromplastic resin is selected from the following group: polyolefin (polyethylene, polypropylene, and copolymers), vinyl polychloride, polystyrene and copolymers, polyamide, saturated polyester, polyphenylene ether, polycarbonate and plastic alloys.

The adjuvant is selected from the following group: antioxidant, carbon black, colorant, light stabilizing agent, antistatic, fireproofing agent, sliding agent, metal deactivators and all other additives known to confer the desired properties to the final product.

In a preferred embodiment, the reinforcing fibers are glass fibers of a length between 5 and 30mm and of a unitary diameter between 10 and 20 micrometers. Their concentration, in dry weight in relation to that of the material, is between 15 and 60 percent.

In a variation of the invention, besides the reinforcing fibers discussed above, the material contains unoxidizable steel fibers or aluminized glass fibers to render the molded product conductive, cellulosic fibers for lowering the cost of the composition, in cases where the parameters of moldability permit, and if none of the desired properties for plastic applications are affected.

Preferably, the ground powder is of a mean diameter greater than or equal to 100 micrometers.

Below this limit, it is difficult to grind powder and it is necessary to retain it in the wet sheet by equipping the form with a screen with mesh openings so small that they oppose the elimination of the water.

In another variation, the granules contain, besides the resin and the adjuvant, a mineral load such as an opaquing agent or partial reinforcer (talc, carbonate or mica, for example). Obviously, the granules can contain several resins and several adjuvants, as would be appreciated by one of ordinary skill in the art.

The suspension of fibers and powder can contain, in addition, a polyolefin paste, comprising fibrils of high specific surface area. It is anticipated, accordingly, that the reinforcing fibers can undergo a post-oiling of organosilane or organosilicone type.

The material of the invention is intended to be transformed by molding, stamp-molding or thermomolding and may, for example, be used for the production of accessories in the automobile industry.

The following examples illustrate the invention. The quantities are given in parts by weight. Each example includes a test carried out according to conventional procedures. The same test was applied to the teachings of the invention. Thus the advantages of the invention may be seen from a comparison of the results obtained by the present invention and the comparative example.

COMPARATIVE EXAMPLE 1

In 10,000 parts of water containing 0.04 percent of a fatty acid based cationic dispersing agent, dispersed 40 parts of glass fiber cut into 6 millimeter sections in which the unitary fibers have a diameter of 10 micrometers (ED 10 160 5093×5 of VETROTEX), followed by the addition of 60 parts of a polypropylene powder (ELTEX® P of SOLVAY), in which the granulometry is such that there are no particles having a diameter less than 200 micrometers, 95 percent being between 200 and 700 micrometers. 0.6 parts of carbon black of average granulometery of 27 micrometers are then introduced, and after dilution to 2 grams per liter, the mixture is poured under agitation with compressed air upon the metallic web of a laboratory hand form. The web has a mesh of 220×120 micrometers and can thus play the role of the sieve vis-a-vis the polypropylene powder.

The resulting sheet, wherein all of the glass fibers are individualized, is dried, reheated to 240° C. and molded into a plastic piece in which the color is clear gray because the major part of the carbon black is not retained in the sheet.

EXAMPLE 1

The same experiment is repeated except that a powder made according to the invention by grinding granules of homopolymeric polypropylene, containing 1 percent carbon black is substituted for the polypropylene (ELTEX®) used in comparative example 1. This crushed powder has 70 percent of the particles of diameter between 250 and 500 micrometers, 5 percent being less than 160 micrometers. The resulting plastic piece is profoundly black.

COMPARATIVE EXAMPLE 2

As in comparative example 1, a suspension is prepared having 40 parts of glass fibers of 6 millimeter length, and of 10 micrometer diameter, 60 parts of polypropylene powder and 0.5 parts of an antioxidant AO (44'-Thiobis(6 tertiobutyl-metacresol)). The resulting sheet contains practically to thermal aging is very weak: the loss of weight in a ventilated oven at 150° C. is, for a thickness of 500 micrometers, 24 percent in 3 days, when without antioxidant it is 20 percent.

EXAMPLE 2

A sheet can be made starting with 40 parts of the same glass fibers and 60 parts of a polypropylene powder obtained by grinding granules containing 98 percent of antioxidant AO: the thermal aging behavior is good, since the loss of weight is only 10 percent in 13 days.

Of course, modifications to the products and procedures can be employed by one of ordinary skill in the art using equivalent means without parting from the framework of the invention, which can be uniquely described by non-limiting claims.

I claim:

1. A wet process for making a thermoplastic composition which can be transformed by molding, molding-stamping or thermomolding into a final product, which comprises forming an aqueous suspension containing reinforcing fibers, at least one thermoplastic resin and at least one adjuvant, dewatering and drying the suspension on a screen, wherein the thermoplastic resin and the adjuvant are intimately mixed in each grain of a powder having a granulometry larger than the mesh of the screen on which the composition is dewatered and which powder is added to the suspension prior to dewatering on the screen to produce a thermoplastic composition for thermoprocessing which contains substantially all of the adjuvants; said powder having been formed by grinding granules formed by extrusion of an intimate mixture of the thermoplastic resin and the adjuvant.

2. A process according to claim 18 wherein the wet process is a papermaking process and the screen is part of the form used in the papermaking process.

3. A process according to claim 4, wherein the process is carried out on the flat table of the papermaking process.

4. A process according to claim 18, wherein the reinforcing fibers are glass fibers, of a length between 5 and 30 mm, and having a unitary diameter between 10 and 20 micrometers, and wherein their concentration in dry weight relative to the said material is between 15 and 60 percent.

5. A process according to claim x18 which additionally includes at least one of the following fibers: unoxidizable steel fibers, aluminized glass fibers or cellulosic fibers.

6. A process according to claim 4, wherein the powder has an average diameter equal to or greater than 100 micrometers.

7. A process according to claim 5, wherein the granules additionally include at least one adjuvant which is carbon black, an antioxidant agent, an antistatic agent or mixtures thereof.

8. A process according to claim 5, wherein the reinforcing fibers have undergone a post-oiling of the organosilane or organosilicone type.

* * * * *

UNITED STATES PATENT AND TRADEMARK OFFICE
CERTIFICATE OF CORRECTION

PATENT NO.    : 4,913,774
DATED         : April 3, 1990
INVENTOR(S)   : Michel GOGUELIN It is certified that error appears in the above-identified patent and that said Letters Patent is hereby corrected as shown below:

Column 4:
Claim 2, line 1, delete "18" and insert --1--.

Claim 3, line 1, delete "4" and insert --2--.

Claim 4, line 1, delete "18" and insert --1--.

Claim 5, line 1, delete "x18" and insert --1--.
Column 5:
Claim 6, line 1, delete "4" and insert --2--.

Claim 7, line 1, delete "5" and insert --3--.
Column 6:
Claim 8, line 1, delete "5" and insert --3--.

Signed and Sealed this

Twentieth Day of October, 1992

*Attest:*

DOUGLAS B. COMER

*Attesting Officer*   Acting Commissioner of Patents and Trademarks